United States Patent [19]

Hudson

[11] 3,995,461
[45] Dec. 7, 1976

[54] WHEEL LOCK

[76] Inventor: Kirk P. Hudson, 5248 N. Paulina, Chicago, Ill. 60640

[22] Filed: Mar. 31, 1976

[21] Appl. No.: 672,274

[52] U.S. Cl. .................................. 70/225; 70/259; 301/37 AT
[51] Int. Cl.² .......................................... B60B 7/00
[58] Field of Search ............ 70/259, 260, 169, 225, 70/226; 301/37 CM, 37 SC, 37 AT

[56] References Cited
UNITED STATES PATENTS

| | | | |
|---|---|---|---|
| 2,077,698 | 4/1937 | Hurd | 70/259 X |
| 2,594,407 | 4/1952 | Earnest | 70/169 |
| 3,352,133 | 11/1967 | Selleck | 70/259 |
| 3,833,266 | 9/1974 | Lamme | 70/259 X |
| 3,918,764 | 11/1975 | Lamme | 70/259 |

Primary Examiner—J. Franklin Foss
Attorney, Agent, or Firm—Merriam, Marshall, Shapiro & Klose

[57] ABSTRACT

A wheel lock for preventing theft of automobile wheels comprises a first cover plate blocking access to the wheel bolts, said plate being attached to said bolts by screws passing through the plate, and a second cover plate in contact with and covering said screws. The cover plates are held in position by a removable plug lock passing through both of said plates.

10 Claims, 6 Drawing Figures

WHEEL LOCK

This invention relates to a wheel lock for preventing theft of a wheel from a vehicle such as an automobile.

The prior art contains many versions of wheel and hub cap locks, as exemplified by U.S. Pat. Nos. 2,107,015; 3,833,266; 2,329,945; 2,847,096; 2,535,126; 3,317,247; 3,170,733; 2,995,402 and 2,594,407. In general, all of these devices comprise cover plates attached to the wheel structure and covering the attachment means holding the wheel to the vehicle, the plates being locked by suitable means which permit removal when desired. The cover plates of the prior art were generally attached to the wheel structure by means of elongated arms or spiders which were generally clamped between the wheel and the bolts or nuts used to hold the wheel to the vehicle. In some cases, these spiders interfered with the proper attachment of the wheel to the vehicle and resulted in problems such as loosening of the wheel or undesirable wear of the lug bolts or nuts. Further, in order to provide clearance for an axle of the wheel, the prior art cover plates were generally formed with an enlarged dome-like configuration which for practical production reasons required the plates to be formed of relatively thin sheet metal. Since the sheet metal could be easily pried away from the wheel by a thief, such plates provided relatively little protection against theft of the wheel.

In accordance with the present invention, there is provided a wheel lock which is formed primarily of flat plates which can be inexpensively produced, even though made with sufficient thickness to withstand attempts at jimmying or prying. Further, the wheel lock is attached to the wheel structure by screw means which cooperate with the outer extremities of the wheel mounting bolts, thus preventing any interference with the mounting bolts or nuts at the point of attachment of the wheel to the vehicle.

The invention will be better understood from the following detailed description thereof, taken in conjunction with the accompanying drawings, in which the same numerals are used to refer to like elements in the several views, and in which.

Figure 1:
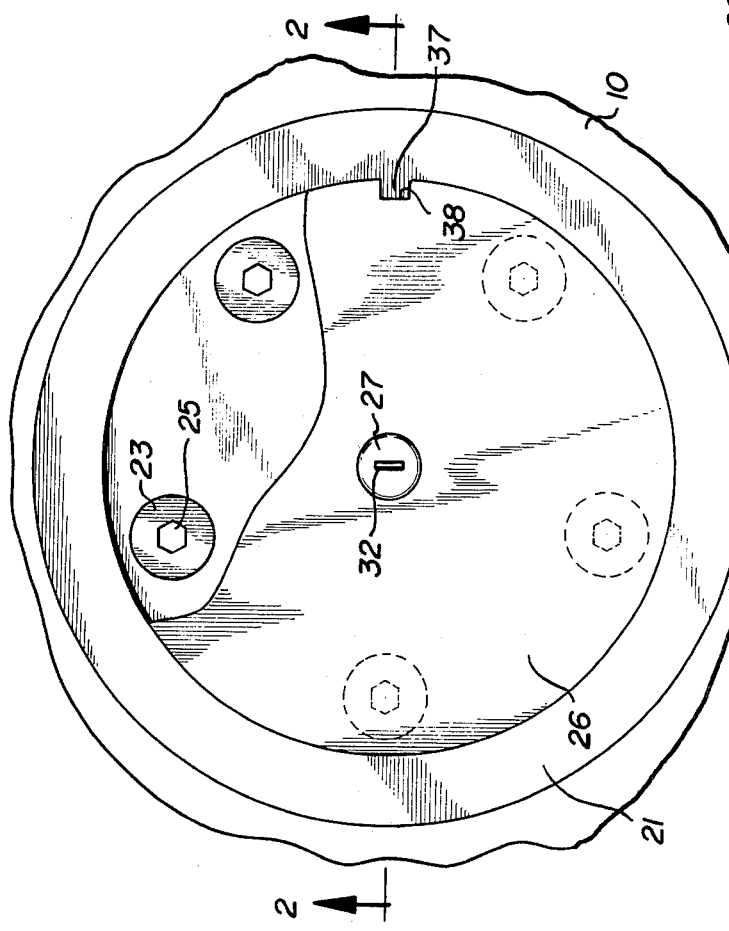
FIG. 1 is a plan view of the hub area of a wheel showing the wheel lock of the invention in place on a wheel of a vehicle which has no protruding axle, a portion of the top cover plate of the wheel lock being broken away to show the screws holding the wheel lock to the wheel.
Figure 2:
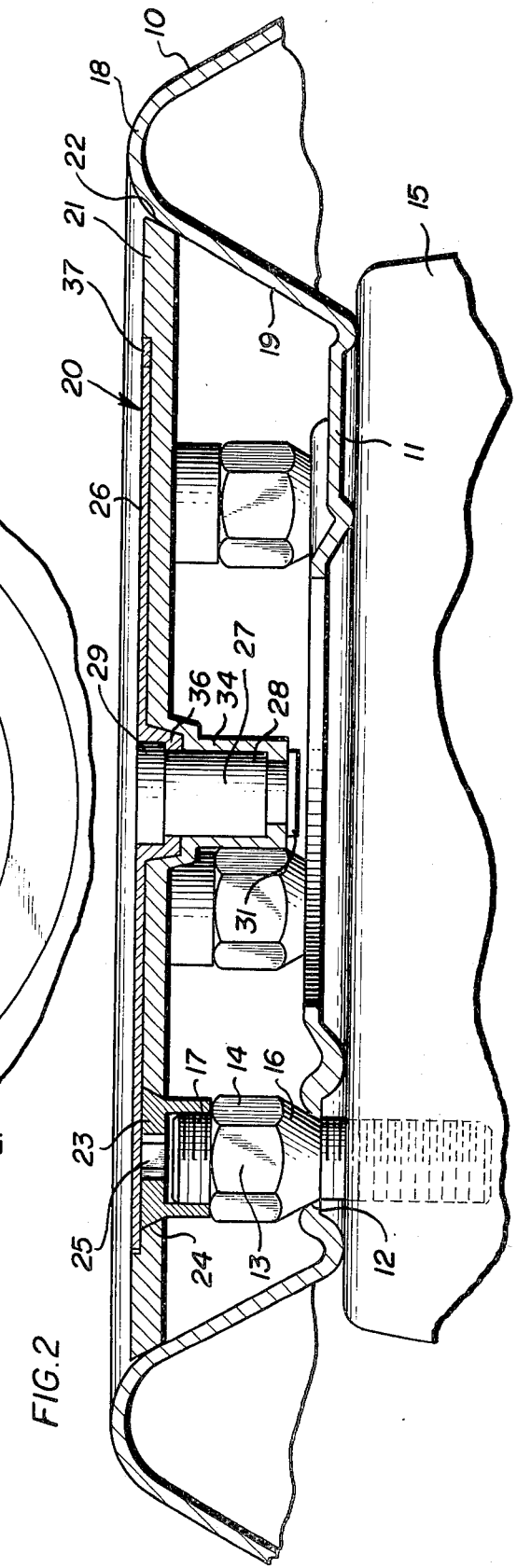
FIG. 2 is a sectional view along the line 2—2 of FIG. 1.

FIGS. 1 and 2 of the accompanying drawings show the hub area of a conventional wheel, such as those used in automobiles, comprising a disc 10 having a centrally inwardly depressed attachment flange 11 provided with a number of bolt holes, e.g., 12, through which are passed bolts 13 for attaching the wheel to vehicle 15 in a conventional manner. As shown in FIG. 2, bolts 13 are provided with heads 14 having conical inner faces 16 which cooperate with holes 12 in attachment flange 11 in a conventional manner to secure the wheel to the vehicle. The outer extremities of bolts 13 are equipped with threaded extensions 17.

The inwardly depressed attachment flange 11 defines in part a circular ridge 18 having an axially outwardly extending surface 19 which surrounds the flange. Wheel disc 10 is attached at its extremity to a conventional rim carrying a tire, not shown.

Except for extensions 17 on bolts 13, the structure described to this point is that of a conventional automobile wheel attached to a vehicle in conventional fashion. The wheel lock 20 of the invention is designed to fit into the circular recess defined by ridge 18 in such a manner as to block access to the bolts 13 holding wheel 10 to vehicle 15. Wheel lock 20 comprises a first plate 21 of a size which permits it to fit into the flange depression with its periphery 22 in contact with surface 19 of ridge 18 at a point below the top of the ridge. First plate 21 is spaced from attachment 11 flange and is held in position by flat-head screws 23 having an inner bore threaded to engage the threaded extensions 17 of bolts 13. The openings 24 in first plate 21 through which screws 23 pass are counter-sunk to permit the flat heads of the screws to lie flush along the outer surface of first plate 21. The heads of screws 23 are provided with means, such as hexagonal recesses 25 as shown, for driving them into and out of engagement with extensions 17 by means of a conventional wrench or screwdriver.

In contact with and overlying first plate 21 to an extent sufficient to cover the heads of screws 23 is a second plate 26 which is preferably circular and concentric with first plate 21. In order to present a smooth unbroken outer surface in the assembled wheel lock, it is preferred to recess the outer surface of first plate 21 to receive second plate 26, whereby the outer surfaces of both plates lie in substantially the same plane. The absence of any exposed projections under which a jimmying tool can be inserted increases the resistance afforded by the wheel lock to forcing by a thief.

Second cover plate 26 is held in position in the assembly during the locked condition thereof by means of a plug lock 27 of conventional form, comprising a cylindrical body 28, an enlarged head 29 and a rotatable locking bar 31. Lock 27 is actuated by means of a key inserted into slot 32 which turns locking bar 31 to a position in which it matches a suitable slot 33 (FIG. 3) in the base of cylindrical well 34 formed in the underside of first plate 21. A mating flange 36 formed on the underside of second cover plate 26 nests into the upper end of well 34. With plug lock 27 in place in the assembly, as shown, removal of second cover plate 26 is prevented by engagement of flange 36 with the head 29 of lock 27. When bar 31 is suitably positioned by means of a key to permit removal of the plug lock from well 34, second plate 26 can be readily removed from its position overlying the heads of screws 23, thus permitting access to the screws. After screws 23 are removed, first cover plate 21 can then also be removed, exposing bolts 13 and permitting the wheel to be removed from the vehicle in a conventional manner.

In order to prevent wear caused by rotation of second plate 26 about plug lock 27, it is desirable to provide in the surface of first cover plate 21 an anti-rotation lug 37. The lug engages a matching slot 38 in the periphery of second plate 26, whereby relative rotation between the plates is prevented.

Although the removable plug lock 27 shown in the figures is suitable for use in the invention, it should be understood that the specific form of lock is not per se a critical part thereof. Any lock which prevents separation of plates 21 and 26 can be used, regardless of whether the lock is removable or fixed to either of the plates and regardless of the lock's specific configuration.

The embodiment shown in FIGS. 1 and 2 is intended for use with vehicles in which no part of the axle on which the wheel rotates protrudes beyond attachment flange 11, a construction typically found in the rear wheels of most automobiles. It is conventional, however, that in the front wheels of such vehicles, the axles, usually provided with bearing covers, protrude through the wheel disc a substantial distance beyond the face of the attachment flange. In such case, the wheel lock shown in FIGS. 1 and 2 cannot be used because the protruding axle interferes with well 34 and prevents positioning of the wheel lock as shown.

Figure 3:
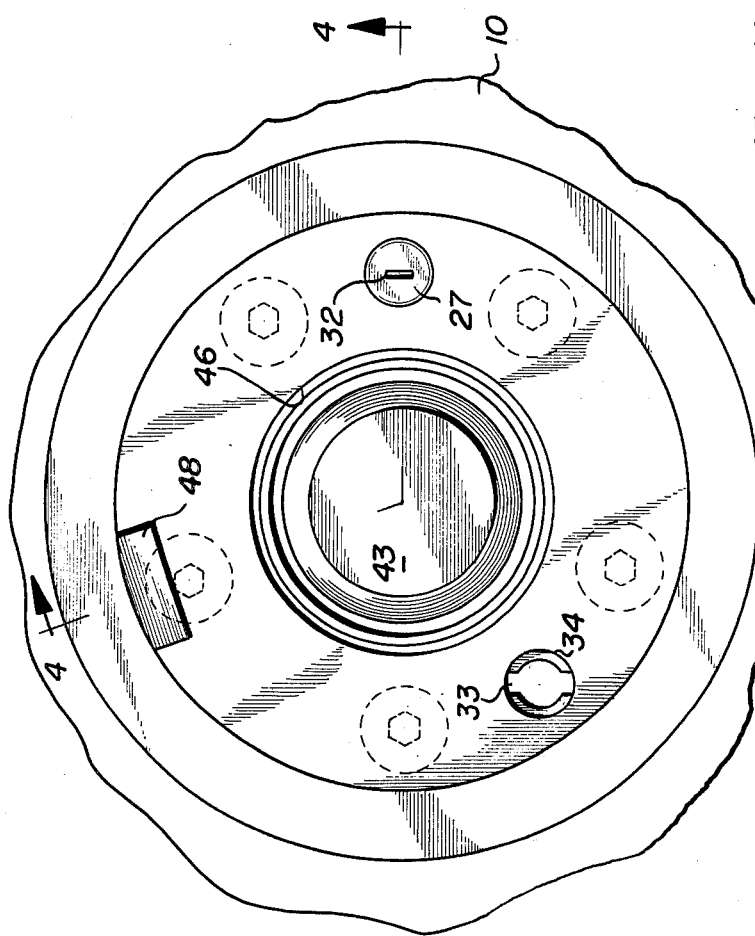
FIG. 3 is a plan view of the hub area of a wheel showing a modified embodiment of the invention adapted for use with a wheel having a protruding axle.
Figure 4:
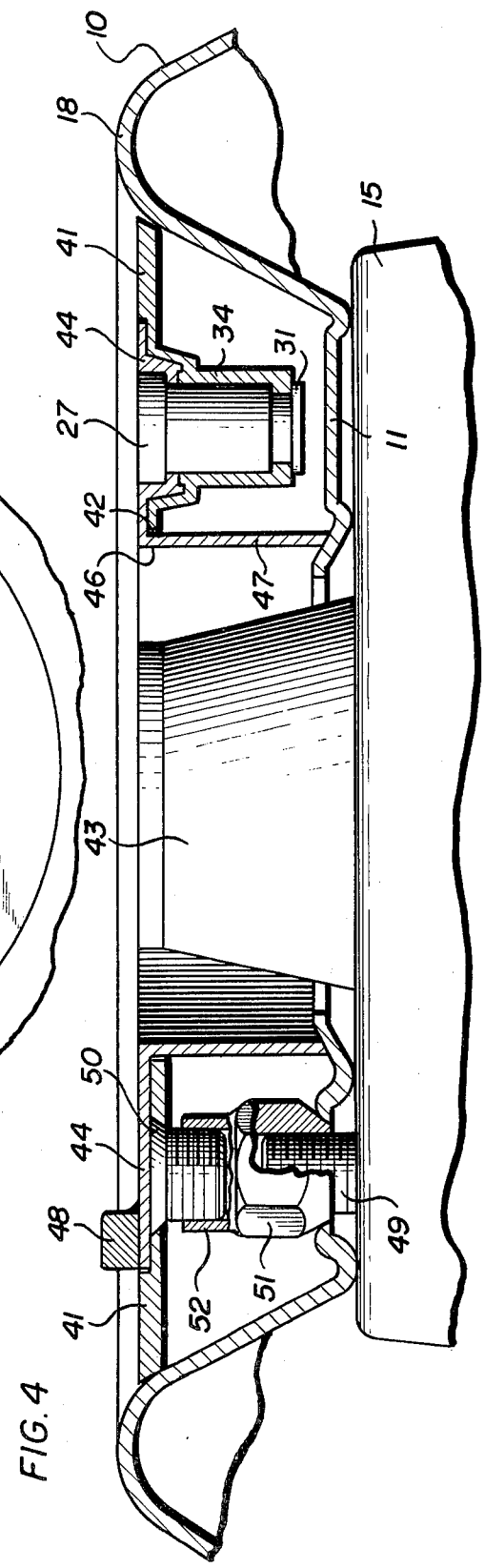
FIG. 4 is a sectional view along the line 4—4 of FIG. 3.

FIGS. 3 and 4 show a modified form of the invention adapted for use with vehicles having protruding axles.

As shown, first plate 41 is provided with a central aperture 42 of a size sufficient to permit axle 43 to protrude therethrough. Second plate 44 is also provided with a similar aperture 46, to the periphery of which is attached a cylindrical portion 47 which telescopes through aperture 44 in first plate 41 and abuts attachment flange 11 at its lower end.

Because of the central opening in this embodiment of the wheel lock of the invention, a central locking plug, as shown in the embodiment of FIGS. 1 and 2, cannot be used. Accordingly, one or more plug locks 27 of the type shown in FIGS. 1 and 2 are used, located at points spaced from the center of the wheel lock, as shown in FIG. 3. In FIG. 3, the plug lock on the left side of the assembly has been removed to show slot 33 through which bar 31 is passed to engage and disengage the plug lock.

In order to maintain the balance of the wheel lock shown in FIGS. 3 and 4, it is preferred to position the plug locks in a symmetrical manner with respect to the center of the wheel lock assembly. With the typical fivebolt arrangement used in many automobiles, however, this may be impossible because of interference caused by the location of the bolts. In such case, the arrangement shown in FIG. 3 can be used, in which two plug locks are non-symmetrically placed with respect to the center of the wheel lock and there is added at an appropriate point in either the first or second plates a balancing weight 48, as shown.

An alternative means for attaching the wheel to the vehicle is illustrated in FIGS. 3 and 4. As shown, wheel disc 10 is held by threaded studs 49 which protrude from the vehicle 15 through the disc and engage threaded nuts 51, the outer extremities of which are provided with internally threaded extensions 52, which in turn engage the threads of screws 50. The construction and operation of the embodiment shown in FIGS. 3 and 4 are otherwise the same as those of the embodiment shown in FIGS. 1 and 2.

Figure 5:
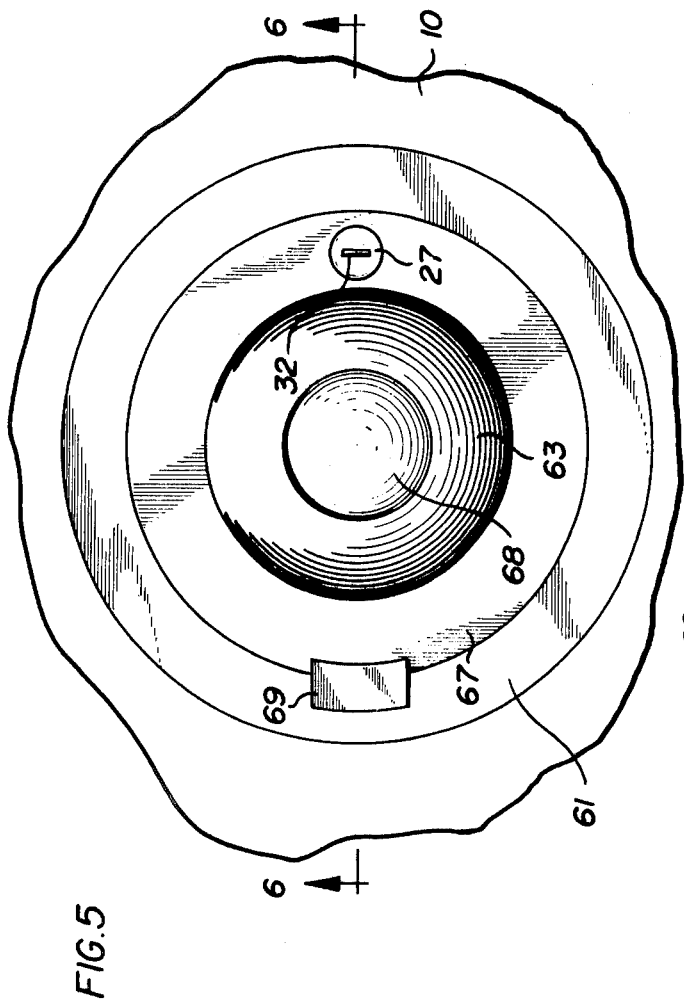
FIG. 5 is a plan view of the hub area of a wheel showing an alternative embodiment of the invention adapted for use with wheels having a protruding axle.
Figure 6:
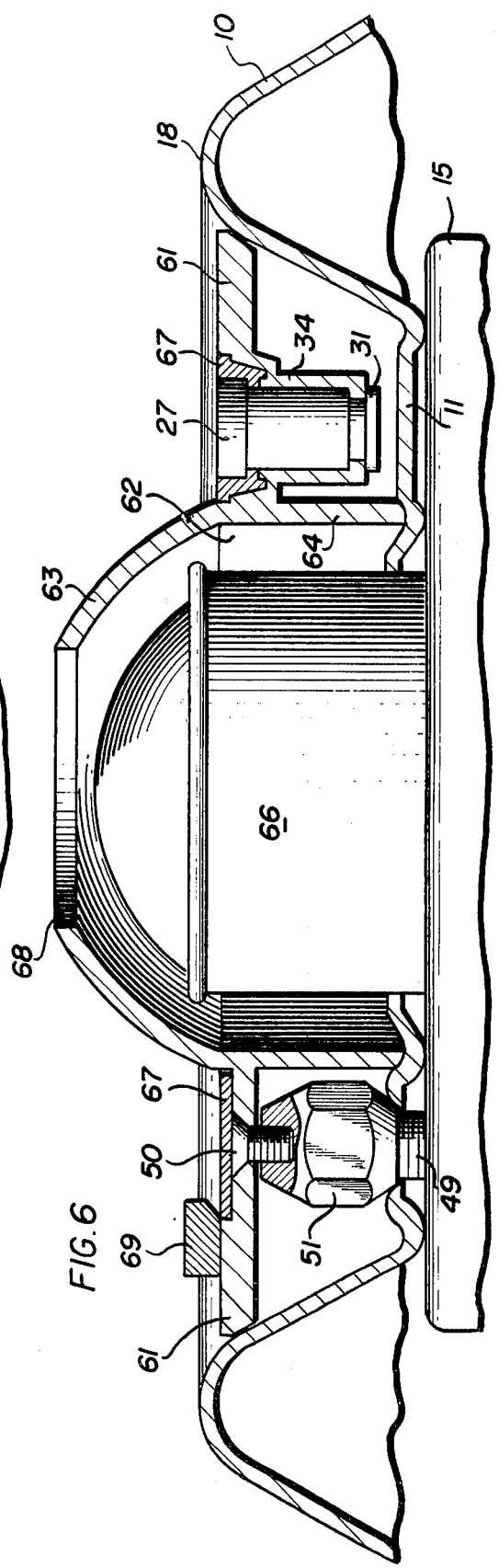
FIG. 6 is a sectional view along the line 6—6 of FIG. 5.

FIGS. 5 and 6 show a further modification of the wheel lock of the invention, adapted for use with vehicles having a protruding axle. In this embodiment, first plate 61 is provided with a central aperture 62, a central outwardly extending dome 63 and an inwardly extending central cylindrical portion 64, the lower end of which abuts flange 11. Elements 63 and 64 together define a chamber into which protruding axle 66 extends. Second plate 67 has a central aperture which permits the dome 63 to extend therethrough as shown. In order to accommodate an axle which protrudes even farther than that shown in the FIGS., dome 63 can also have a central aperture 68 through which the projection can extend. In such case, it is preferred to make the effective size of aperture 68 smaller than bearing cover 65 to prevent removal thereof through the aperture.

Second plate 67 is removably attached to first plate 61 by plug lock 27 which is offset from the center of the wheel lock assembly. In order to maintain the balance of the wheel lock, a second similar plug diametrically opposite that shown can be used, if permitted by the arrangement of the wheel bolt system. If a second symmetrically placed plug lock cannot be used because of the positioning of the wheel bolts, as may be the case with a five-bolt system, the edge of second plate 67 can be locked by means of an overhanging lip 69 attached to first plate 61, which in addition to securing second plate 67 can also act as a counterbalancing weight for maintaining the balance of the wheel.

It will be seen that the invention provides a wheel lock assembly which is sturdy, easily made and, therefore, economical to produce. Because the exposed elements of the wheel lock are planar in form, they can be formed with sufficient thickness to be effective against removal except by the use of extreme force. The parts, particularly the cover plates, mate together in such a manner as to avoid providing locations where a jimmying tool can be inserted to force the structure apart, thus providing the vehicle owner with substantial protection against wheel and tire theft at a reasonable cost.

The foregoing detailed description has been given for clearness of understanding only, and no unnecessary limitations should be understood therefrom, as modifications will be obvious to those skilled in the art.

I claim:

1. A wheel lock for a vehicle wheel of the type comprising a body having a central axially inwardly depressed attachment flange surrounded by a ridge having an axially outwardly extending surface, said wheel being adapted for attachment to said vehicle by bolt means passing through said attachment flange, said lock comprising:
   a first cover plate adapted to overlie said attachment flange, with its periphery substantially in contact with said surface of said ridge;
   screw means passing through said first cover plate adapted to engage the outer extremity of said bolt means;
   a second cover plate in contact with said first cover plate and overlying said screw means; and
   lock means passing through said first and second plates for preventing separation thereof.

2. A wheel lock in accordance with claim 1 in which the outer surface of said first plate is recessed to receive said second plate, whereby the exposed surfaces of said first and second cover plates lie in substantially the same plane.

3. A wheel lock in accordance with claim 1 in which said plates are substantially concentric.

4. A wheel lock in accordance with claim 3 in which said lock means is substantially centrally located in said plates.

5. A wheel lock in accordance with claim 3 in which said plates are centrally apertured to accomodate a protruding axle of said wheel.

6. A wheel lock in accordance with claim 3 in which said first plate is provided with a central outwardly extending dome adapted to accomodate a protruding axle of said wheel and said second plate is provided with a central aperture through which said dome extends.

7. A wheel lock in accordance with claim 6 in which said dome is apertured for accomodating said protruding axle.

8. A wheel lock in accordance with claim 5 provided with a plurality of said lock means which are non-symmetrically located with respect to the center of said plates, at least one of said plates being provided with a balancing weight designed to counteract the unbalancing effect of said lock means.

9. A wheel lock in accordance with claim 5 provided with a single lock means off-set from the center of said plates, said first plate being provided with a radially inwardly extending overhanging lip portion protruding over the rim of said second plate, said lip portion serving to prevent separation of said plates.

10. A wheel lock in accordance with claim 9 wherein the weight of said lip portion is such as to counterbalance the weight of said off-set lock means.

* * * * *